US012786164B2

(12) United States Patent
Slobodyanuk et al.

(10) Patent No.: US 12,786,164 B2
(45) Date of Patent: Nov. 3, 2026

(54) SYSTEM AND METHOD FOR GENERATING A SIGNATURE OF A SPAM MESSAGE BASED ON CLUSTERING

(71) Applicant: AO Kaspersky Lab, Moscow (RU)

(72) Inventors: Yury G. Slobodyanuk, Moscow (RU); Dmitry S. Golubev, Moscow (RU); Alexey S. Marchenko, Moscow (RU); Alexey E. Utki-Otki, Moscow (RU)

(73) Assignee: AO Kaspersky Lab, Moscow (RU)

( * ) Notice: Subject to any disclaimer, the term of this patent is extended or adjusted under 35 U.S.C. 154(b) by 84 days.

(21) Appl. No.: 18/906,240

(22) Filed: Oct. 4, 2024

(65) Prior Publication Data

US 2025/0047639 A1 Feb. 6, 2025

Related U.S. Application Data

(63) Continuation of application No. 17/565,570, filed on Dec. 30, 2021, now Pat. No. 12,143,358.

(30) Foreign Application Priority Data

Mar. 15, 2021 (RU) .......................... RU2021106650

(51) Int. Cl.

| | |
|---|---|
| ***H04L 9/40*** | (2022.01) |
| ***G06F 18/20*** | (2023.01) |
| ***G06F 18/2413*** | (2023.01) |
| ***G06F 18/2415*** | (2023.01) |
| ***G06N 3/08*** | (2023.01) |

(Continued)

(52) U.S. Cl.

CPC .... *H04L 63/0227* (2013.01); *G06F 18/24147* (2023.01); *G06F 18/24155* (2023.01); *G06F 18/295* (2023.01); *G06N 3/08* (2013.01); *G06N 7/02* (2013.01); *H04L 51/212* (2022.05); *H04L 63/1425* (2013.01); *H04L 63/20* (2013.01)

(58) Field of Classification Search

CPC ............... H04L 63/0227; H04L 51/212; H04L 63/1425; H04L 63/20; G06F 18/24147; G06F 18/24155; G06F 18/295; G06N 3/08; G06N 7/02

See application file for complete search history.

(56) References Cited

U.S. PATENT DOCUMENTS 7,725,475 B1 5/2010 Alspector et al.
8,010,614 B1 8/2011 Musat et al.

(Continued)

*Primary Examiner* — SM A Rahman

(74) *Attorney, Agent, or Firm* — ArentFox Schiff LLP; Michael Fainberg

(57) ABSTRACT

A method for generating a signature of a spam message includes determining one or more classification attributes and one or more clustering attributes contained in successively intercepted first and second electronic messages. The first electronic message is classified using a trained classification model for classifying electronic messages based on the one or more classification attributes. The first electronic message is classified as spam if a degree of similarity of the first electronic message to one or more spam messages is greater than a predetermined value. A determination is made whether the first electronic message and the second electronic message belong to a single cluster based on the determined one or more clustering attributes. A signature of a spam message is generated based on the the identified single cluster of electronic messages.

20 Claims, 4 Drawing Sheets

(51) Int. Cl.
*G06N 7/02* (2006.01)
*H04L 51/212* (2022.01)

(56) References Cited

U.S. PATENT DOCUMENTS

| | | | | |
|---|---|---|---|---|
| 8,918,466 | B2 * | 12/2014 | Yu | H04L 51/212<br>709/206 |
| 9,363,280 | B1 * | 6/2016 | Rivlin | H04L 63/1441 |
| 2014/0373142 | A1 * | 12/2014 | Zheleva | G06F 21/50<br>726/22 |
| 2016/0028674 | A1 * | 1/2016 | Smith | H04L 67/306<br>709/206 |
| 2019/0281000 | A1 | 9/2019 | Giura et al. | |
| 2020/0404049 | A1 * | 12/2020 | Moon | H04L 67/108 |
| 2024/0177522 | A1 * | 5/2024 | Arngren | G06N 20/10 |

* cited by examiner

SYSTEM AND METHOD FOR GENERATING A SIGNATURE OF A SPAM MESSAGE BASED ON CLUSTERING

The present application is a continuation of U.S. patent application Ser. No. 17/565,570, which claims priority to a Russian Application No. 2021106650, filed on Mar. 15, 2021, the entire contents of which are incorporated herein by reference.

FIELD OF TECHNOLOGY

The present disclosure relates generally to the technical field of cybersecurity and, more specifically, to a system and method for creating a signature of an unwanted electronic message.

BACKGROUND

As the use of electronic devices (such as a computer, a mobile telephone, a smartphone, a tablet or the like) has grown, so too has the amount of unwanted electronic messages, in the form of SMS messages and emails from banks, health centers, insurance companies, beauty salons and other companies using telemarketing in their work, among many others. Additionally, "identity thieves" or "scammers" often attempt to illicitly obtain sensitive data (such as bank account numbers, credit card data, social insurance numbers, personal data or the like).

Advertising on the Internet is one of the cheapest forms of advertising. Spam is a mass mailing of advertising or other form of information to people who have not expressed a desire to receive it. Spam includes messages sent by electronic mail, instant messaging protocols, in social networks, blogs, dating sites, forums, and also SMA and MMS messages. Spam messages have become the main and most large-scale form of advertising in the modern world, since they already account for 70-90% of the total volume of global mail traffic. Such large volumes of unwanted emails creates difficulties for the email user and disrupts the operation of mail servers. In particular, such large volumes of spam lead to a deterioration in network performance.

There are two main approaches to the detection of unwanted electronic messages. A first approach uses electronic signatures and a second approach uses machine learning methods.

In the first, electronic signature approach, a mass mailing of electronic messages is broken down into parts, and signatures are created from submultiples of these. The electronic signatures may be used for the unambiguous detection of unwanted electronic messages in an electronic message exchange system (in text messages, chat room messages, control messages, commands, e-mails, documents, audiovisual files, Short Message Service messages (SMSes), voice calls (i.e., VOIP), and video calls, for example). An advantage of this approach is a high detection rate and low false positive rate. In this case, a false positive is a non-SPAM message which is incorrectly identified as SPAM. A drawback of this approach is the throughput of unwanted electronic messages (i.e., the appearance of an error of the second kind).

Another known methodology for spam detection involves the use of neural networks and similar machine learning techniques (e.g., Bayesian networks, support vector machines). A collection of unwanted electronic messages and a collection of legitimate electronic messages are used in machine learning methods. Machine learning systems are sometimes trained to recognize spam and legitimate e-mail. These approaches require that the network be trained against both spam and non-spam. A classifier may be trained by extracting characteristics of both spam and non-spam messages. An advantage of this machine learning approach is the high generalization ability, enabling a minimum throughput of unwanted electronic messages to be achieved. On the other hand, this machine learning approach has the drawback of a large number of false positives, as well as a slow detection speed as compared to the signature approach.

Therefore, there is a need to perform the task of detecting unwanted electronic messages by generalizing a signature verdict with the aid of machine learning methods.

SUMMARY

Disclosed are systems and methods for generating a signature of a spam message.

Advantageously, the task of detecting unwanted electronic messages is performed by generalizing a signature verdict with the aid of machine learning methods.

In one aspect, a method is proposed for generating a signature of a spam message. One or more classification attributes and one or more clustering attributes contained in each of at least two successively intercepted electronic messages are determined. The at least two successfully intercepted electronic messages include a first electronic message and a second electronic message. The first electronic message is classified using a trained classification model for classifying electronic messages based on the one or more classification attributes. The first electronic message is classified as spam if a degree of similarity of the first electronic message to one or more spam messages is greater than a predetermined value. A determination is made whether the first electronic message and the second electronic message belong to a single cluster based on the determined one or more clustering attributes. A signature of a spam message is generated based on the the identified single cluster of electronic messages.

In one aspect, an intercepted electronic message is classified as spam when the intercepted electronic message is transmitted for at least one of: commission of fraud; unsanctioned receipt of confidential information; selling of goods and services.

In one aspect, the trained electronic message classification model utilizes at least one of: Bayesian classifiers, logistic regression, a Markov Random Field (MRF) classifier, a support vector method, a k-nearest neighbors method, a decision tree, a recurrent neural network.

In one aspect, the one or more clustering attributes comprise at least one of: a sequence of words extracted from a text of the corresponding electronic message, a fuzzy hash value calculated based on the sequence of words from the text of the corresponding electronic message, a vector characterizing the text of the corresponding electronic message.

In one aspect, the signature of the spam message is generated based on one of: a most common sequence of words in the text of one or more electronic messages contained in the identified single cluster of electronic messages; a most common sequence of characters in the fuzzy hash values calculated based on the text of the one or more electronic messages contained in the identified single cluster of electronic messages.

In one aspect, the signature of the spam message is generated based on a re-identified cluster of spam messages. More spam messages are identified by using the generated signature than by using a previously generated signature.

In one aspect, the second electronic message identified as spam message, in response to determining that the one or more clustering attributes of the second electronic message contain the generated signature.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for creating a signature of a SPAM message. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
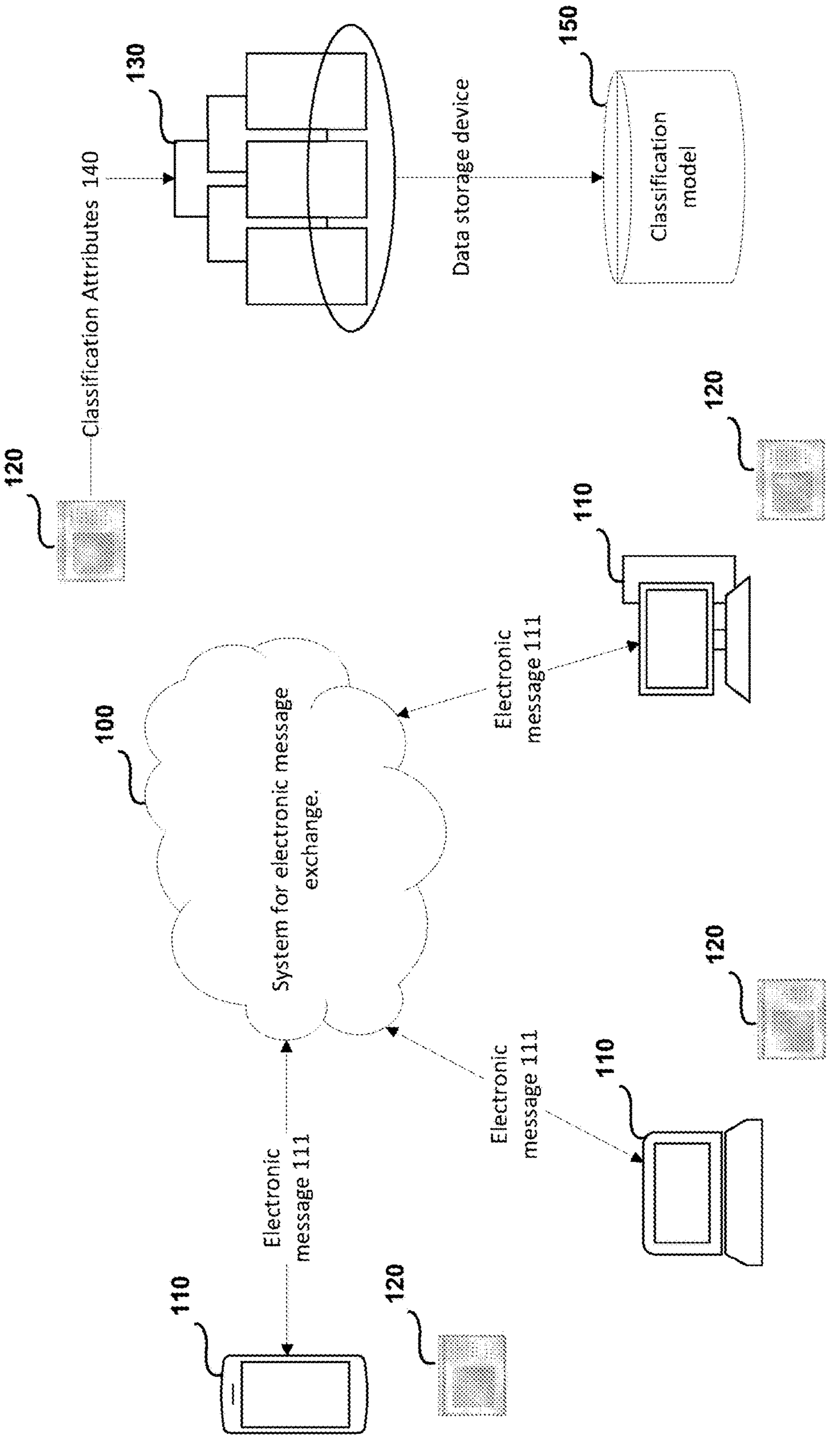
FIG. 1 illustrates an example environment in which a system for electronic message exchange may interact with other devices.

FIG. 1 illustrates an example environment in which a system for electronic message exchange may interact with other devices.

As shown in FIG. 1 a system for electronic message exchange 100 may interact with a user device 110 via an electronic message 111, which may be intercepted by an agent 120. In turn, the agent 120 may interact with a data storage device 130 to store classification attributes 140 which may be used for training of a classification model 150.

The electronic message exchange system 100 may comprise a multichannel communication system that may include either hardware, a combination of hardware and software, or software. In an aspect, the electronic message exchange system 100 may implement a protocol for transmitting an electronic message 111 between user devices 110.

Examples of the electronic message exchange system 100 may include, but are not limited to:

a mail service;

an instant messaging service;

a messenger.

In an aspect, the electronic message 111 may have a specific structure. In addition to the message body, the electronic message 111 may include headers consisting of service information. The service information may include information about the route followed by the electronic message 111. The headers may show details identifying timing and an originator of the electronic message 111. The header portions may further identify a route by which the electronic message 111 has arrived, along with information added to said electronic message 111 by various service programs. Each header is identified by its own name and value. The value of a header may be information presented in a predetermined form. For example, if the electronic message 111 is an email, a header may comprise information about the sender of the electronic message 111, where the "from" field constitutes the sender's name, while the value field takes the form of the sender's email address (for example, username@domain.com).

The user of the device 110 may create an electronic message 111 and may transmit the electronic message 111 to the electronic message exchange system 100. Furthermore, the user of the device 110 may also receive an electronic message 111 from other devices 110.

The agent 120 may be configured to intercept the electronic message 111 by at least one of:

monitoring the traffic received and transmitted according to the electronic message transmission protocol (Post Office Protocol 3 (POP3), Simple Mail Transfer Protocol (SMTP), Internet Message Access Protocol (IMAP), or Network News Transfer Protocol (NNTP));

monitoring files in the store of the electronic message exchange system 100;

monitoring files in the store of the user device 110.

For example, the agent 120 may be implemented as a security add-on module (program component) produced by AO Kaspersky Lab (e.g., Kaspersky Internet Security).

In an aspect, the agent 120 may determine the classification attributes 140 contained in the intercepted electronic message 111, and may transmit the determined classification attributes 140 to the data storage device 130.

For example, the classification attributes 140 of an email may include, but are not limited to: header values relating to information about the message transmission route, as well as service information created by email clients, namely:

Message_ID: a unique identifier of an email, assigned by the first mail server encountered by the email on its route;

X-mailer (mailer_name): the value of a header field in which the mail client or the service used in the creation of the email identifies itself;

a sequence of values of headers of the email.

In another aspect, the agent 120 may be configured to determine the classification attributes 140 of an electronic message 111 on the basis of an event associated with said electronic message 111. For example, the classification attributes 140 of an instant message may include, but are not limited to:

a flag indicating that the user has read the electronic message 111;

a flag indicating an interaction with the user device 110 during the reading of the electronic message 111 (for example, user scrolling through the message);

a flag indicating that the user has deleted the electronic message 111.

The data storage device 130 may be configured to store and process the classification attributes 140. For example, the classification attributes 140 may be used for training the classification model 150.

In an aspect, the data storage device 130 may store the classification attributes 140 and may be implemented as a cloud storage. Cloud storage provides an abstraction for physical storage devices. Cloud storage generally involves delivering data storage as a service, often billed on a usage basis. That is, cloud storage allows users to store and access the classification attributes 140 somewhere in "the cloud," without knowing the details of where files are stored or having to manage physical storage devices. In cloud storage, capacity can be available on demand and stored data can be made available on a global basis.

For example, the data storage device 130 may be implemented as Kaspersky Security Network (KSN) system produced by AO Kaspersky Lab.

Figure 2:
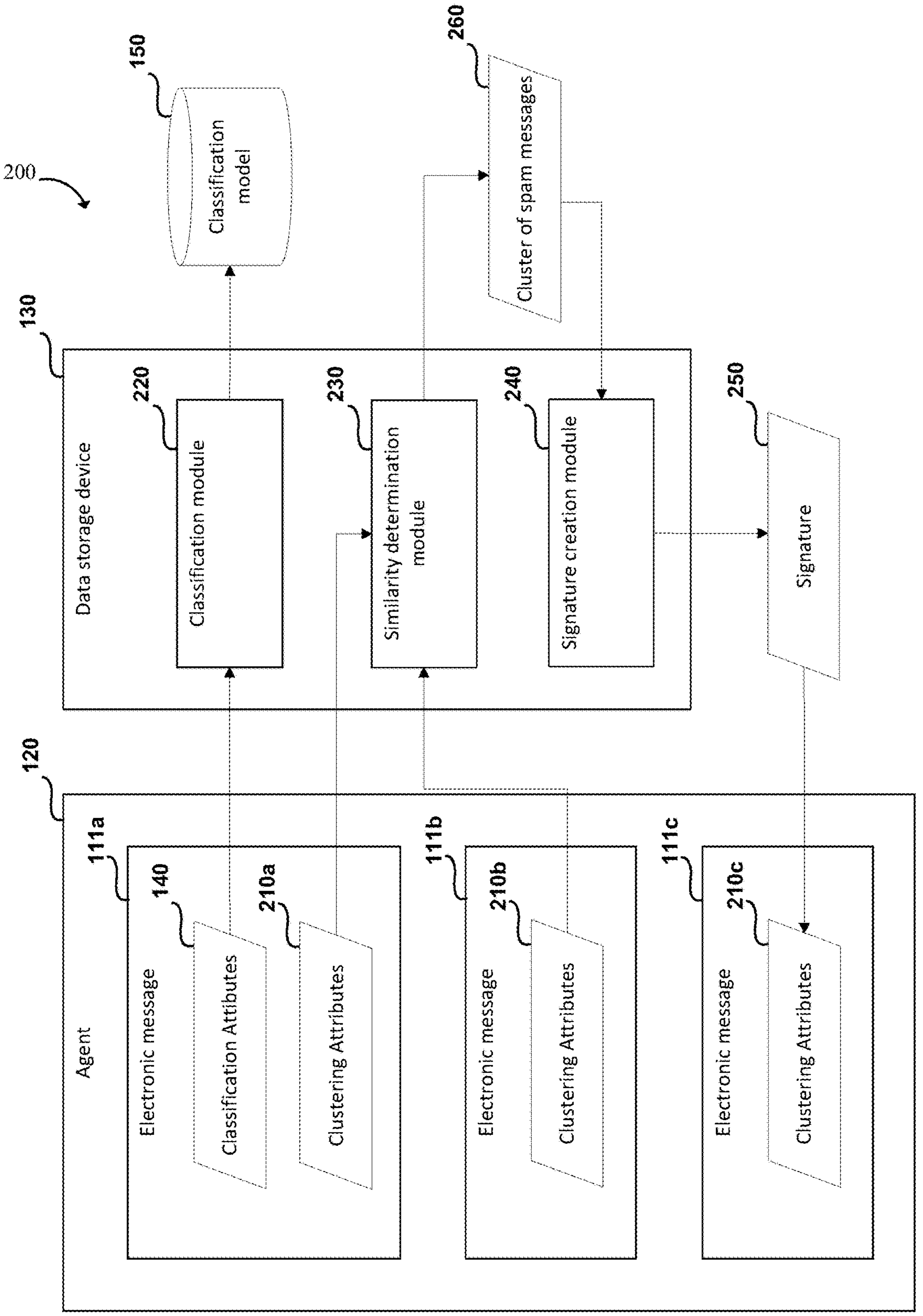
FIG. 2 illustrates an example architecture of a system providing a method for creating a signature of a SPAM message.

FIG. 2 illustrates an example architecture of a system providing a method for creating a signature of a SPAM message.

The system providing a method for creating a signature of a SPAM message 200 may include an electronic message 111 (including 111*a*, 111*b*, 111*c*), an agent 120, a data storage device 130, classification attributes 140, clustering attributes 210 (including 210*a*, 210*b*, 210*c*), a classification model 150, classification module 220, similarity determination module 230, a signature creation module 240, a signature 250, and a cluster of SPAM messages 260.

In one aspect, the classification module 220, the similarity determination module 230 and the signature creation module 240 may be components of the data storage device 130.

In alternative aspect, the classification module 220, the similarity determination module 230 and the signature creation module 240 may take the form of separate, independent, but interconnected hardware devices that may be implemented by separate computer systems.

In an aspect, the agent 120 may be configured to intercept an electronic message 111 (including 111*a*, 111*b*, 111*c*), to determine the classification attributes 140 and the clustering attributes 210 (including 210*a*, 210*b*, 210*c*), and to transmit the classification attributes 140 and the clustering attributes 210*a* and 210*b* to the data storage device 130.

The clustering attributes 210 may include, but are not limited to:

- a sequence of words extracted from the text of the electronic message 111;
- a fuzzy hash value calculated based on the sequence of words from the text of the electronic message 111;
- a vector characterizing the text of the electronic message 111.

In an aspect, the data storage device 130 may be configured to classify the electronic message 111*a*, to determine whether the electronic messages 111*a* and 111*b* belong to a single cluster, and configured to create the signature 250.

As noted above, the classification module 220, which may be a component of the data storage device 130, may be configured to classify the electronic message 111*a* based on classification attributes 140 using the classification model 150. The classification model 150 may classify the electronic message 111*a* as being, at least one of:

- unwanted (SPAM); or
- legitimate.

For example, the SPAM message may include an unsolicited electronic message 111 transmitted, at least, for:

- the commission of fraud;
- the unsanctioned receipt of confidential information;
- selling of goods and services.

The classification model 150 may be trained in advance, using the classification attributes 140 transmitted to the data storage device 130, in such a way that the classification model 150 determines, based on said attributes, the characteristics which are used for the classification of the electronic message 111*a* as SPAM with a given probability.

The classification model 150 may employ any of the following machine learning algorithms (or a combination thereof):

- naive Bayesian classifiers;
- logistic regression;
- a Markov Random Field (MRF) classifier;
- a support vector machine (SVM);
- a k-nearest neighbors method;
- a decision tree;
- a recurrent neural network, (RNN).

For example, the classification model 150 may employ deep learning methods. In particular, the classification attributes 140 may be provided in the form of a matrix where each symbol of a classification attribute 140 is encoded by a fixed-length vector of numbers and may be transformed using a neural network, which may calculate the degree of similarity of said attributes to the attributes of suspect messages. The characteristics may take the form of the classification attributes 140 transformed by a layer of the neural network.

The classification module 220 may identify the electronic message 111*a* as unwanted (SPAM) if the degree of similarity of the electronic message 111*a* to SPAM messages is greater than a predetermined value (for example, greater than 0.7).

The similarity identification module 230, which may be a component of the data storage device 130, may be configured to determine whether the electronic messages 111*a* and 111*b* belong to a single cluster, based on the clustering attributes 210*a* and 210*b*.

For example, the agent 120 may transmit to the data storage device 130 the determined clustering attributes 210*a* and 210*b* of corresponding electronic messages 111*a* and 111*b*, using clustering attributes 210 that may comprise a fuzzy hash value calculated based on a sequence of words from the text of the electronic messages 111*a* and 111*b*. In an aspect, the similarity determination module 230 may calculate the Levenshtein distance. The Levenshtein distance operates between two input strings, and returns a number equivalent to the number of substitutions and deletions needed in order to transform one input string (e.g., the first electronic message 111*a*) into another (e.g., the second electronic message 111*b*. In an aspect, the similarity determination module 230 may be configured to determine that the electronic messages 111*a* and 111*b* relate to a single cluster if said metric (Levenshtein distance) does not exceed a predetermined value.

The data storage device 130 may determine that the electronic messages 111*a* and 111*b* relate to a cluster of SPAM messages 260 if the electronic message 111*a* has been classified by the classification module 220 as SPAM, and if the similarity determination module 230 has determined that the electronic messages 111*a* and 111*b* belong to a single cluster.

The signature creation module 240, which may be a component of the data storage device 130, may be configured to generate an electronic signature 250 of a SPAM message, based on the cluster of SPAM messages 260.

The signature 250 of the cluster of SPAM messages 260 may be generated based on at least one of the following criteria:

- the most common sequence of words in the text of the electronic messages 111*a* and 111*b* contained in the cluster of SPAM messages 260;
- the most common subsequence of fuzzy hash characters, calculated based on the text of the electronic messages 111*a* and 111*b* contained in the cluster of SPAM messages 260.

In one aspect, the signature of a SPAM message may be generated based on a re-identified cluster of SPAM messages, in such a way that more SPAM messages can be identified by using the generated signature than by using the current signature 250.

The signature creation module 240 may also be configured to transmit the generated signature 250 to the agent 120, which may determine whether the clustering attributes 210*b* of the electronic message 111*b* contain the signature 250. If the clustering attributes 210*b* of the electronic message 111*b* contain the signature 250, the agent 120 may identify the electronic message 111*b* as an electronic message belonging to the cluster of SPAM messages 260, and may be configured to provide data security.

The provision of data security may include, but is not limited to at least:

- blocking a SPAM message 111*b;*
- informing the recipient of the unwanted nature of the electronic message 111*b;*
- transmitting the classification attributes 140 and clustering attributes 210 of the electronic message 111*b* to the data storage module 130.

Figure 3:
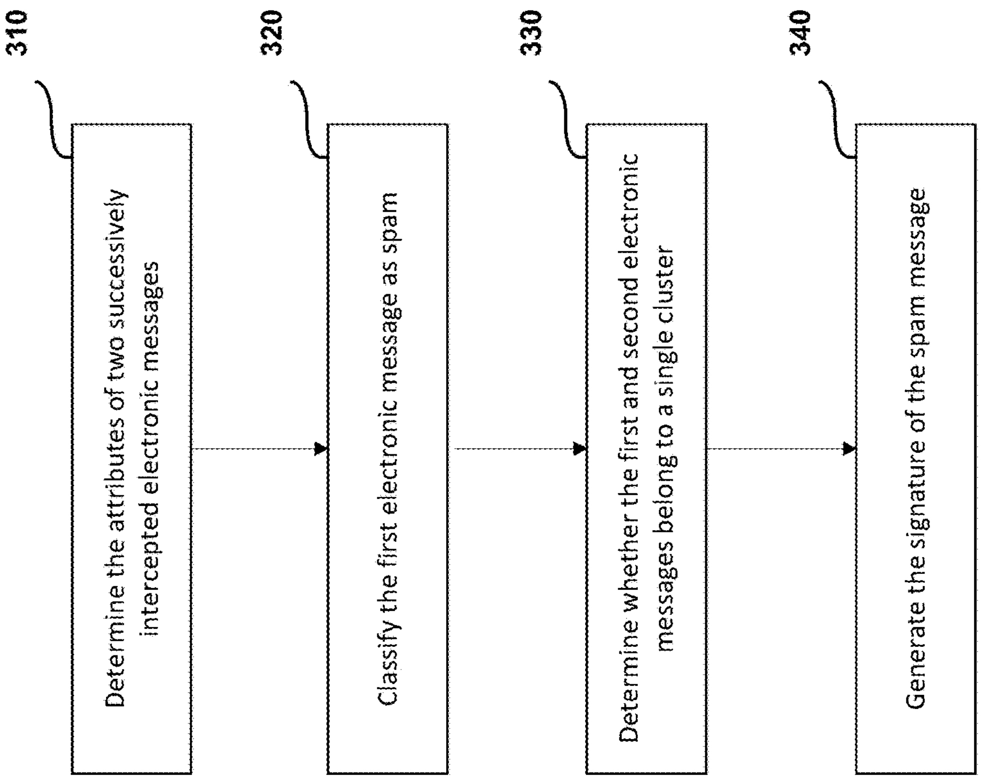
FIG. 3 illustrates a method for creating a signature of a SPAM message.

FIG. 3 illustrates a method for creating a signature of a SPAM message.

At step 310, the agent 120 may determine the attributes 210 of two successively intercepted electronic messages 111. The attributes may include the classification attributes 140 and the clustering attributes 210. The clustering attributes 210 may include, but are not limited to: a sequence of words extracted from the text of the electronic message 111, a fuzzy hash value calculated based on the sequence of words from the text of the electronic message 111, a vector characterizing the text of the electronic message 111.

At step 320, the classification module 220 may employ the classification model 150 to classify the first electronic message 111 based on classification attributes 140. The classification model 150 may employ deep learning methods. The classification module 220 may identify the electronic message 111*a* as SPAM if the degree of similarity of the electronic message 111*a* to SPAM messages is greater than a predetermined value.

At step 330, the similarity identification module 230 may determine whether the first and second electronic messages 111 belong to a single cluster 260 based on the clustering attributes 210*a* and 210*b*. In an aspect, the similarity determination module 230 may be configured to determine that the electronic messages 111*a* and 111*b* belong to a single cluster if Levenshtein distance does not exceed a predetermined value. The Levenshtein distance operates between two input strings, and returns a number equivalent to the number of substitutions and deletions needed in order to transform one input string (e.g., the first electronic message 111*a*) into another (e.g., the second electronic message 111*b*).

At step 340, in response to determining that the first and second messages belong to a single cluster, the signature creation module 240 may generate the electronic signature 250 of the SPAM message 240 based on the cluster of SPAM messages 260. The signature creation module 240 may also be configured to transmit the generated signature 250 to the agent 120, which may determine whether the clustering attributes 210*b* of the electronic message 111*b* contain the signature 250. If the clustering attributes 210*b* of the electronic message 111*b* contain the signature 250, the agent 120 may identify the electronic message 111*b* as an electronic message belonging to the cluster of SPAM messages 260, and may be configured to provide data security.

Figure 4:
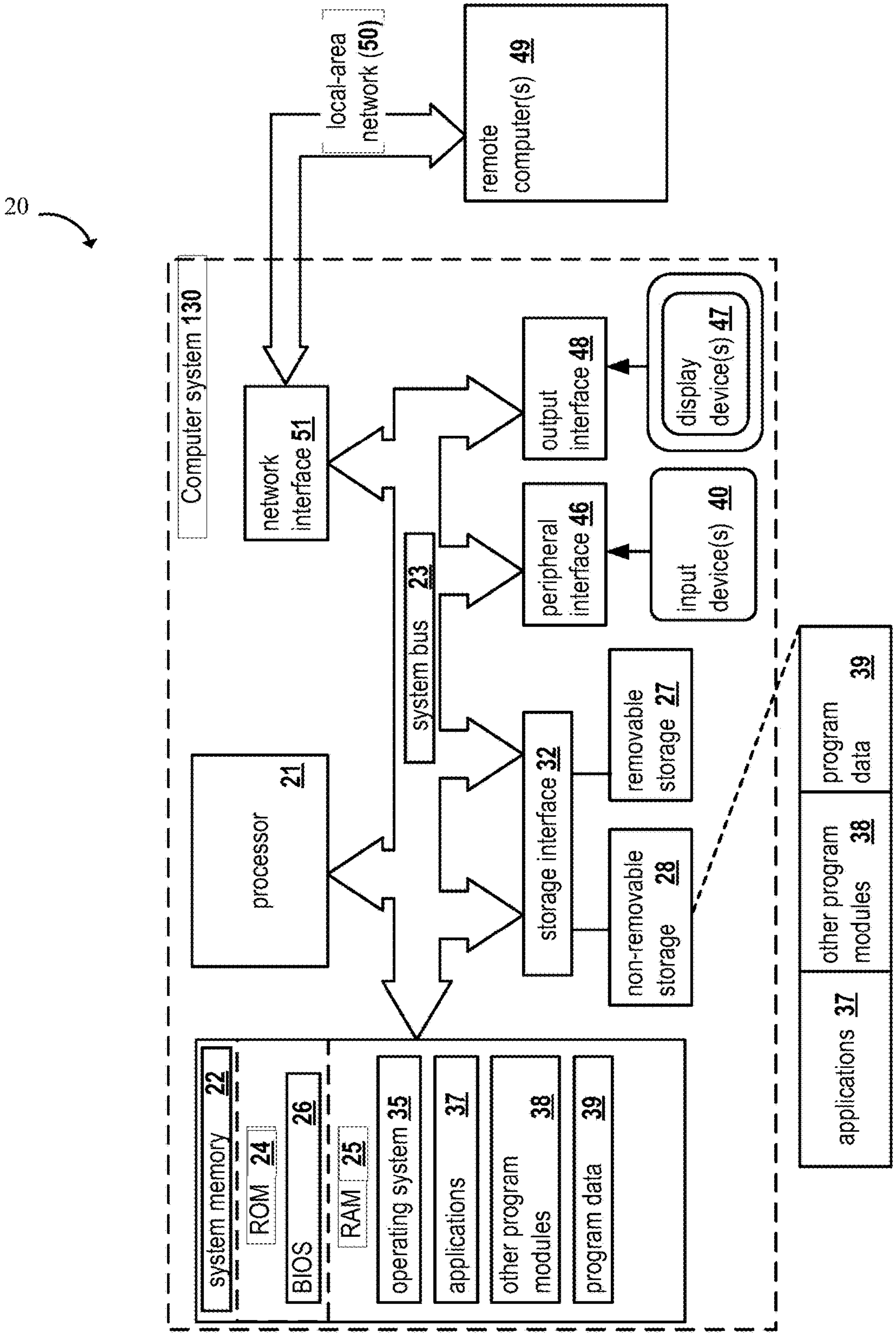
FIG. 4 shows an example of a computer system on which variant aspects of systems and methods disclosed herein may be implemented.

FIG. 4 shows an example of a computer system 20 on which variant aspects of systems and methods disclosed herein may be implemented. The computer system 20 may represent the data storage device 130 of FIG. 1 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 300.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 300 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for generating a signature of a spam message, the method comprising:

successively intercepting at least two electronic messages, including a first electronic message and a second electronic message;

determining one or more classification attributes and one or more clustering attributes of the at least two successively intercepted electronic messages;

classifying the first electronic message among the two successively intercepted electronic messages as a spam message based on the one or more classification attributes using a trained classification model, wherein the first electronic message is classified as spam if a degree of similarity of the first electronic message to one or more spam messages is greater than a predetermined value;

determining whether the first electronic message and the second electronic message belong to a single cluster based on the one or more clustering attributes;

generating a signature of a spam message based on the identified single cluster of electronic messages; and providing data security to a recipient of the second electronic message based on the generated signature, the data security comprising at least one of: blocking the second electronic message or informing the recipient of an unwanted nature of the second electronic message.

2. The method according to claim 1, wherein the one or more clustering attributes comprise at least one of: a sequence of words extracted from a text of a corresponding electronic message, a fuzzy hash value calculated based on the sequence of words from the text of the corresponding electronic message, or a vector characterizing the text of the corresponding electronic message.

3. The method of claim 1, wherein the machine learning method is trained using the one or more classification attributes to determine characteristics used for classification of electronic messages as a spam message with a given probability.

4. The method according to claim 2, wherein the machine learning method comprises a trained classification model utilizing at least one of: Bayesian classifiers, logistic regression, a Markov Random Field (MRF) classifier, a support vector method, a k-nearest neighbors method, a decision tree, or a recurrent neural network.

5. The method of claim 1, further comprising:

in response to determining that the one or more clustering attributes of the intercepted second electronic message contain the generated signature, identifying the intercepted second electronic message as a spam message belonging to the single cluster of electronic messages.

6. The method of claim 1, wherein an intercepted electronic message is classified as spam when the intercepted electronic message is transmitted for at least one of: commission of fraud; unsanctioned receipt of confidential information; or selling of goods and services.

7. The method according to claim 1, wherein the signature of the spam message is generated based on one of: a most common sequence of words in text of one or more electronic messages contained in the identified single cluster of electronic messages; or a most common sequence of characters in fuzzy hash values calculated based on the text of the one or more electronic messages contained in the identified single cluster of electronic messages.

8. The method according to claim 1, wherein the signature of the spam message is generated based on a re-identified cluster of spam messages, and wherein more spam messages are identified by using the generated signature than by using a previously generated signature.

9. A system for generating a signature of a spam message, the system comprising:

a hardware processor configured to:

successively intercept at least two electronic messages, including a first electronic message and a second electronic message;

determine one or more classification attributes and one or more clustering attributes of the at least two successively intercepted electronic messages;

classify the first electronic message among the at least two successively intercepted electronic messages as a spam message based on the determined one or more classification attributes using a trained classification model, wherein the first electronic message is classified as spam if a degree of similarity of the first electronic message to one or more spam messages is greater than a predetermined value;

determine whether the at least two successively intercepted electronic messages belong to a single cluster based on the one or more clustering attributes;

generate a signature of a spam message based on the identified single cluster of electronic messages; and provide data security to a recipient of the second electronic message based on the generated signature, the data security comprising at least one of: blocking the second electronic message or informing the recipient of an unwanted nature of the second electronic message.

10. The system of claim 9, wherein the one or more clustering attributes comprise at least one of: a sequence of words extracted from a text of a corresponding electronic message, a fuzzy hash value calculated based on the sequence of words from the text of the corresponding electronic message, or a vector characterizing the text of the corresponding electronic message.

11. The system of claim 9, wherein the machine learning method is trained using the one or more classification attributes to determine characteristics used for classification of electronic messages as a spam message with a given probability.

12. The system of claim 10, wherein the machine learning method comprises a trained classification model utilizing at least one of: Bayesian classifiers, logistic regression, a Markov Random Field (MRF) classifier, a support vector method, a k-nearest neighbors method, a decision tree, or a recurrent neural network.

13. The system of claim 9, the hardware processor is further configured to:

in response to determining that the one or more clustering attributes of the intercepted second electronic message contain the generated signature, identify the intercepted second electronic message as a spam message belonging to the single cluster of electronic messages.

14. The system of claim 9, wherein an intercepted electronic message is classified as spam when the intercepted electronic message is transmitted for at least one of:

commission of fraud; unsanctioned receipt of confidential information; or selling of goods and services.

15. The system of claim 9, wherein the signature of the spam message is generated based on one of: a most common sequence of words in text of one or more electronic messages contained in the identified single cluster of electronic messages; or a most common sequence of characters in fuzzy hash values calculated based on the text of the one or more electronic messages contained in the identified single cluster of electronic messages.

16. The system of claim 9, wherein the signature of the spam message is generated based on a re-identified cluster of spam messages, and wherein more spam messages are identified by using the generated signature than by using a previously generated signature.

17. A non-transitory computer readable medium storing thereon computer executable instructions for generating a signature of a spam message, including instructions for:

successively intercepting at least two electronic messages, including a first electronic message and a second electronic message;

determining one or more classification attributes and one or more clustering attributes of the at least two successively intercepted electronic messages;

classifying the first electronic message among the two successively intercepted electronic messages as a spam message based on the one or more classification attributes using a trained classification model, wherein the first electronic message is classified as spam if a degree of similarity of the first electronic message to one or more spam messages is greater than a predetermined value;

determining whether the first electronic message and the second electronic message belong to a single cluster based on the one or more clustering attributes;

generating a signature of a spam message based on the identified single cluster of electronic messages; and providing data security to a recipient of the second electronic message based on the generated signature, the data security comprising at least one of: blocking the second electronic message or informing the recipient of an unwanted nature of the second electronic message.

18. The method of claim 1, wherein the one or more classification attributes are provided in a form of a matrix where each symbol of a classification attribute is encoded by a fixed-length vector of numbers and is transformed using a neural network, which calculates the degree of similarity of said attributes to attributes of suspect messages.

19. The system of claim 9, wherein the one or more classification attributes are provided in a form of a matrix where each symbol of a classification attribute is encoded by a fixed-length vector of numbers and is transformed using a neural network, which calculates the degree of similarity of said attributes to attributes of suspect messages.

20. The method of claim 1, wherein determining whether the at least two successively intercepted electronic messages belong to the single cluster comprises calculating a Levenshtein distance between the first electronic message and the second electronic message, and determining that the first electronic message and the second electronic message belong to the single cluster when the Levenshtein distance does not exceed a predetermined value.

* * * * *